(12) United States Patent
Banerjea et al.

(10) Patent No.: US 6,240,128 B1
(45) Date of Patent: May 29, 2001

(54) ENHANCED ECHO CANCELER

(75) Inventors: Raja Banerjea, Edison; Bahman Barazesh, Marlboro; Yhean-Sen Lai, Warren; Kannan Rajamani, Tinton Falls, all of NJ (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/096,425

(22) Filed: Jun. 11, 1998

(51) Int. Cl.$^7$ .............................. H04L 5/16; H04B 1/38; H04B 15/00; H03K 5/06
(52) U.S. Cl. .......................... 375/222; 375/285; 375/229; 375/232
(58) Field of Search ...................................... 375/222, 285, 375/220, 296, 346, 229, 232, 233, 355, 377; 379/93.01, 402, 406, 410; 370/286

(56) References Cited

U.S. PATENT DOCUMENTS

| | | | |
|---|---|---|---|
| 4,535,206 | | 8/1985 | Falconer ............................ 179/170.2 |
| 4,924,492 | * | 5/1990 | Gitlin et al. ....................... 379/93.01 |
| 5,005,168 | * | 4/1991 | Cummiskey et al. ............... 375/222 |
| 5,095,497 | * | 3/1992 | Aman et al. ........................ 375/285 |
| 5,132,963 | | 7/1992 | Ungerboeck .......................... 370/286 |
| 5,162,812 | * | 11/1992 | Aman et al. ......................... 375/346 |
| 5,163,044 | * | 11/1992 | Golden ................................ 379/410 |
| 5,319,636 | * | 6/1994 | Long et al. .......................... 370/286 |
| 5,631,899 | | 5/1997 | Duttweiller .......................... 370/291 |
| 5,864,545 | * | 1/1999 | Gonikberg et al. ................. 379/410 |
| 6,018,755 | * | 1/2000 | Gonikberg et al. ................. 708/319 |

OTHER PUBLICATIONS

Sylvie Marcos and Odile Macchi, "Joint Adaptive Echo Cancellation and Channel Equalization For Data Transmission", *Signal Processing*, vol. 20, No.1, May 1990, pp. 43–65.

K.H. Muller, "Combining Echo Cancellation and Decision Feedback Equalization", *B.S.T.J.*, vol. 58, No. 2, Feb. 1979, pp. 491–500.

* cited by examiner

*Primary Examiner*—Tesfaldet Bocure

(57) ABSTRACT

A so-called post equalization echo canceler is utilized in conjunction with transmitter and receiver data timing synchronization to enhance tracking of the echo path impulse response and convergence of the transversal filter in the post equalization echo canceler. This is realized by employing the equalization error in the receiver to adapt coefficients of the post equalization echo canceler transversal filter, in conjunction, with the transmitter and receiver data timing synchronization. The timing synchronization is realized by using sample rate conversion of the transmit sample rate to the receive sample rate and, in one example, variable phase interpolation of the converted timing signal. The receiver timing is recovered, and a phase error signal generated by the timing recovery unit is advantageously employed to adjust a variable phase interpolator in the receiver and a variable phase interpolator in a path supplying the transmitter signal to an input of the post equalization echo canceler. This insures that both the adaptive transversal filter of the post equalization echo canceler and a transversal filter in an equalizer in the receiver are operating on data having the same timing. In this example, the timing is that of the received data signal. In an embodiment of the invention, the post equalization echo canceler is utilized in conjunction with a so-called conventional, e.g., a primary, echo canceler. The conventional echo canceler is employed before the equalizer to cancel a major portion of any echo signal, while the post equalization echo canceler is employed after the equalizer to cancel residual echo signals caused primarily by drift in the hybrid network. To this end, the conventional echo canceler is "trained" during the initial half-duplex operation of the modem and, then, updating of its impulse response is inhibited, while the post equalization echo canceler is allowed to continue adapting.

22 Claims, 2 Drawing Sheets

ENHANCED ECHO CANCELER

TECHNICAL FIELD

This invention relates to modems and, more particularly, to echo cancelers employed in modems.

BACKGROUND OF THE INVENTION

Echo cancelers are employed in modems in order to achieve full-duplex data communications. A number of different echo cancellation techniques have been employed in order to simplify the echo canceler structure and/or improve overall data communications. These prior techniques have employed echo cancelers at various positions in the receive path of the modem in attempting to improve over-all echo cancellation and, in particular, adaptation speed in synthesizing an echo. Indeed, it is desirable to have the echo canceler transversal filter impulse response rapidly converge to the impulse response of the echo path. To this end, the prior techniques "trained" the echo canceler during the so-called "half-duplex" operation of the modem. Modems are typically connected to a two-wire telephone line through a hybrid, i.e., 2-to-4-wire conversion, network, whose characteristics tend to change over time and, especially, because of temperature variations. Consequently, the echo canceler impulse response synthesis capability must be updated in order to track changes in the echo path impulse response characteristic. This is especially true in modems, employing the so-called PCM technique, i.e., pulse code modulation technique, which are embedded in personal computers, and particularly, laptop computers. In these and similar applications, because of the use of smaller so-called form factors in the circuitry, there are more rapid circuit characteristic changes caused by rapid temperature variations, which translate into faster impedance drift of the hybrid network. Thus, it is desirable to rapidly track variations in the echo path impulse response in order to enhance modem performance. This leads to a well known dichotomy of noise and rapid response. To achieve rapid response in synthesizing the echo path impulse response a large adaptation step size is desirable but causes noise which degrades data communication capability. To minimize noise a small adaptation step size is desirable but results in a slow convergence when synthesizing the echo path impulse response. This problem is acute in PCM modems because the values of PCM symbols vary significantly from one symbol to another and a very small adaptation step size is required in order to avoid adverse effects in the modem receiver performance. The small adaptation step size, of course, translates into too poor of a tracking capability for practical applications.

SUMMARY OF THE INVENTION

These and other problems and limitations of prior known modem echo canceler arrangements are overcome by utilizing a so-called post equalization echo canceler, and transmitter and receiver data timing synchronization to enhance tracking of the echo path impulse response and convergence of the transversal filter in the post equalization echo canceler. This is realized by employing the equalization error in the receiver to adapt coefficients of the post equalization echo canceler transversal filter, in conjunction, with the transmitter and receiver data timing synchronization. The timing synchronization is realized by using sample rate conversion of the transmit sample rate to the receive sample rate and, in one example, variable phase interpolation of the converted timing signal.

More specifically, the receiver timing is recovered and a phase error signal generated by the timing recovery unit is advantageously employed to adjust a variable phase interpolator in the receiver and a variable phase interpolator in a path supplying the transmitter signal to an input of the post equalization echo canceler. This insures that both the adaptive transversal filter of the post equalization echo canceler and a transversal filter in an equalizer in the receiver are operating on data having the same timing. In this example, the timing is that of the received data signal.

In an embodiment of the invention, the post equalization echo canceler is utilized in conjunction with a so-called conventional, e.g., a primary, echo canceler. The conventional echo canceler is employed before the equalizer to cancel a major portion of any echo signal, while the post equalization echo canceler is employed after the equalizer to cancel primarily echo signals caused by drift in the hybrid network. To this end, the conventional echo canceler is "trained" during the initial half-duplex operation of the modem and, then, updating of its impulse response is inhibited, while the post equalization echo canceler is allowed to continue adapting.

DETAILED DESCRIPTION

At the outset, it is thought best to further discuss tracking of the echo path impulse response by echo cancelers employed in data transmitters and receivers. As indicated above, it is very desirable to have a rapid tracking capability in order to rapidly converge the impulse response of an echo canceler to that of a changing echo path impulse response. This requires synchronization of the transmit and receive sample rates. It is noted that in many applications, the nominal sample rates of the data transmitter and data receiver are different. This is particularly true for modems employing the so-called PCM, i.e., pulse code modulation, technique, where the transmit, i.e., upstream, and receive, i.e., downstream, modulation schemes can be different. Consequently, the upstream and downstream sample rates are typically different. In one example, not to be construed as limiting the scope of the invention, the upstream modulation is V.34 having a sample rate of 9600 samples/second and the downstream modulation is PCM having a sample rate of 8000 samples/second. We have determined that in order for a post equalization echo canceler, as employed in one embodiment of the invention, to converge its impulse response rapidly to that of any changing residual echo path impulse response, both the input signal to the post equalization echo canceler and the output signal from a receive equalizer must be operating at the same sample rate and must be in phase. Otherwise, the phases of the transmit data signal supplied to the post equalization echo canceler and the receive data signal are drifting relative to each other and, consequently, the estimated residual echo path impulse response being synthesized by the post equalization echo canceler will not converge to the residual echo path impulse response. Therefore, changes in the echo path impulse response will not be "tracked", thereby causing errors in the recovered receive data signal. Additionally, use of a post equalization echo canceler to track changes in the residual echo path impulse response allows use of the residual error signal directly in updating the impulse response characteristic of the post equalization echo canceler. Use of other than a post equalization echo canceler would require the convolution of the error signal, which is a complex process, and would increase the complexity of the echo canceler. Therefore, our use of a post equalization echo canceler in conjunction with synchronization of both the sample rates and phases of the transmit signal supplied to the post equalization echo canceler and the receive signal output from the equalizer, significantly reduces the complexity of the echo canceler, while providing rapid convergence capability. This in turn, yields rapid tracking by the post equalization echo canceler of changes in the residual echo path impulse response.

Figure 1:
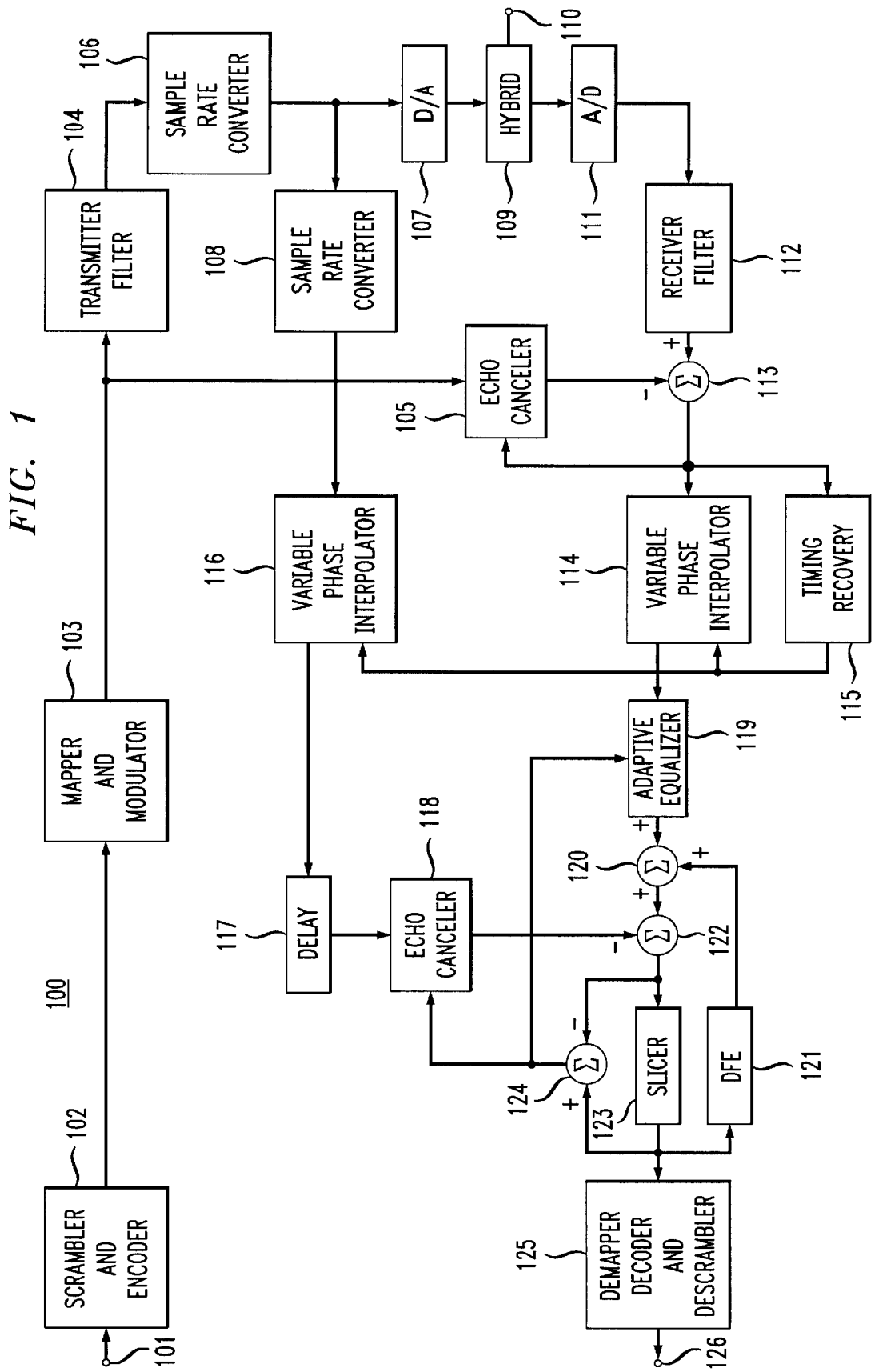
FIG. 1 shows, in simplified block diagram form, details of a modem including an echo canceler arrangement including an embodiment of the invention.

Referring now to FIG. 1, shown, in simplified block diagram form, are details of modem 100 including an echo canceler arrangement including an embodiment of the invention. Input terminal 101 is intended to have a baseband stream of data supplied to it for transmission. The baseband data bits are scrambled and encoded as desired by scrambler and encoder 102, in well known fashion. In this example, encoder 102 is a differential encoder. Thereafter, the encoded output from scrambler and encoder 102 is supplied to mapper and modulator 103, which maps the encoder output into data symbols and generates a complex version of the encoded signal. That is, mapper and modulator 103 generates a complex signal having both in-phase and quadrature phase components. The complex signal is supplied to transmitter filter 104, which yields a real digital transmit signal representation of it and is supplied to an input of first, i.e., primary, echo canceler 105. The real digital transmit signal is also supplied to sample rate converter 106. Sample rate converter 106 is employed in certain applications to convert the sample rate of the real digital transmit signal to a common sample rate employed by both A/D converter 107 and D/A converter 11 of modem 100. It should be noted that in certain applications the conversion rate of sample rate converter 106 may be one-to-one (1:1). Thus, in certain applications sample rate converter 106 can be considered as not even being in the modem transmitter. The sample rate "converted" (transmit signal) output from sample rate converter 106 is supplied to digital-analog-to (D/A) converter 107, where it is converted into an analog transmit signal, and to sample rate converter 108. The analog transmit signal from D/A converter 107 is supplied to hybrid network 109. Hybrid network 109 is employed to supply the analog version of the transmit signal to a two (2) wire bi-directional transmission medium 109 for transmission to a remote modem. Hybrid networks, like hybrid 109, for interconnecting two-wire to four-wire and vice versa transmission paths, are well known in the art, as are their problems and limitations regarding echo signals, both from the transmitter side and from the receiver side of the two wire medium.

A received analog version of a data signal from a remote data transmitter is supplied via bi-directional, i.e., 2-wire, transmission medium 110, to hybrid 109 and, then, to analog-to digital (A/D) converter 111. The resulting digital received signal from A/D 111 is supplied to receive filter 112. A filtered version of the received digital signal is supplied to a positive input of algebraic combining unit 113. A first echo estimate signal generated by echo canceler 105 is supplied to a negative input of algebraic combining unit 113, where it is algebraically subtracted from the filtered received digital signal to yield a first error signal. The resulting error signal is supplied to an update input of echo canceler 105, to variable phase interpolator 114 and to timing recovery unit 115. Echo canceler 105 is of a well type and includes an adaptive transversal filter for generating the first echo estimate signal. Adaptive transversal filters employed in echo cancelers are now well known in the art. See for example, U.S. Pat. No. 3,500,000 and an article authored by D. L. Duttweiler entitled "A Twelve-Channel Digital Echo Canceler", *IEEE Transactions on Communications*, Vol. COM-26, No. 5, May, 1978, pages 647–453. In this example, the adaptive transversal filter in echo canceler 105 is "trained" during the half-duplex mode of operation of modem 100 and, specifically, during the hand shaking period between modem 100 and a remote modem. An impulse response characteristic is generated in echo canceler 105, which generates the first echo estimate signal that will eliminate the major portion of any echo signal supplied to the receive portion of modem 100. The resulting first error signal from algebraic combining unit 113 contains only elements related to the echo and remaining intersymbol interference, and line noise. As indicated, the first error signal is supplied to echo canceler 105 to update the transversal filter coefficients in a manner that adaptation noise is minimized to a level comparable to that experienced during the half-duplex training period. In one example, the length of the impulse response synthesis capability of echo cancel 105 is in a range of approximately eight (8) to ten (10) milliseconds.

Timing recovery unit 115 is supplied with the first error signal from algebraic combining unit 113, and is operative to recover the received digital signal timing and generate phase error values at a predetermined sample rate. Such timing recovery units are well known in the art. The phase error values from timing recovery unit 115 are supplied to control variable phase interpolator 114 and variable phase interpolator 116, as explained below.

Synchronization of the timing of echo canceler 118, which is a post equalization echo canceler, and the timing of the receiver is an important aspect of the invention. In particular, the timing of the digital input signal being supplied to echo canceler 118 must be synchronized to the receiver timing of a receive digital signal, in both sample rate and phase. Again, this synchronization of both the sample rates and phases of the input signal to echo canceler 118 and the receive signal is realized by employing sample rate converter 108, and variable phase interpolator 114 and variable phase interpolator 116 in conjunction with the phase error signals from timing recovery unit 115. Again, in certain applications sample rate converter 106 is employed to adjust the sample rate of the digital transmit signal to that of a received signal from a remote modem. Furthermore, it is noted that each of variable phase interpolators 114 and 116 includes an adjustable polynomial and in this example is of a type described in and article authored by C. W. Farrow entitled "A Continuously Variable Delay Element", *IEEE International Symposium on Circuits and Systems*, (ISCAS 1988), Jun. 6–9, 1988, pages 2641–2645. Also see U.S. Pat. No. 4,866,647 issued to Cecil W. Farrow on Sep. 12, 1989.

In one example, not to be construed as limiting the scope of the invention, the transversal filter in the variable phase interpolators 114 and 116 are finite impulse response (FIR) filters. Then, each coefficient of the FIR filter is approximated as a $P^{th}$ order polynomial in delayed as follows:

$$h_d(n) = \sum_{m=0}^{P} C_m(n) d^m, \quad \text{for } n = 0, 1, \ldots N,$$

$$H_d(z) = \sum_{n=0}^{N} h^d(n) z^{-n} = \sum_{m=0}^{P} C_m(z) d^m.$$

Then, in one example, for an input x(n) the variable phase interpolator yields an output W[n] as follows:

$$W[n] = \sum_{m=0}^{5} D^m y_m$$

To this end, the real digital transmit signal output from transmitter filter 104 is supplied to sample rate converter 106, which if utilized in a particular application converts its sample rate, i.e., clock rate, to that of a received signal. The converted output signal from sample rate converter 106 is supplied to sample rate converter 108, which converters its rate to that of a digital receive signal output from equalizer 119. The sample rate converted output signal from sample rate converter 108 is supplied to variable phase interpolator 116, where its phase is adjusted to be in synchronization with an output signal from variable phase interpolator 114 in response to the phase error signals from timing recovery unit 115. The sample rate converted and phase adjusted output signal from variable phase interpolator 116 is supplied as an input to delay unit 117. An output signal from delay unit 117 is supplied as an input signal to second, i.e., post equalization, echo canceler 118. It should be noted that delay unit 117 inserts a delay in the input to echo canceler 118 only when a Viterbi decoder is used as decision unit 123. This is because the Viterbi decoder causes a delay in making decisions regarding which standard symbol will be used for a received symbol and delay unit 117 compensates for this delay in the input to echo canceler 118. When a slicer is employed as decision unit 123, delay unit 117 does not insert any delay to the input signal of echo canceler 118 and, therefore is effectively not in the circuit.

The first error signal from algebraic combining unit 113 is supplied to variable phase interpolator 114 and echo canceler 105. This first error signal is employed in known fashion to update the coefficients of the adaptive transversal filter in echo canceler 105 in order to generate an echo signal estimate representative of the primary portion of the echo signal supplied to the receive side of modem 100. The phase of the received signal after echo cancellation in algebraic combining unit 113 is adjusted in response to the phase error signals from timing recovery unit 115 by variable phase interpolator 114. Note that variable phase interpolator 114 is of a type well known in the art and, in this example, is essentially identical to variable phase interpolator 116, described above. The phase adjusted output signal from variable phase interpolator 116 is supplied to adaptive equalizer 119, which is employed to combat intersymbol interference in well known fashion. Equalizer 119 includes an adaptive transversal filter which is responsive to a second error signal output from algebraic combining unit 124 to adjust its coefficients in known fashion in order to minimize the intersymbol interference in the adjusted first error signal. An equalized output signal from equalizer 119 is supplied to one input of algebraic combining unit 120, where it is algebraically added to an output signal from decision feedback equalizer (DFE) 121. An output from algebraic combining unit 120 is supplied to a positive input of algebraic combining unit 122, while an echo estimate signal generated by echo canceler 118 is supplied to a negative input. These signals are algebraically subtracted in algebraic combining unit 122 and the resulting error signal is supplied to a decision unit which, in this example, is shown as slicer 123 and a negative input of algebraic combining unit 124. It is important to note that both inputs to algebraic combining unit 122, namely, the echo estimate signal from echo canceler 118 and the adjusted output from equalizer 119 effected by algebraic combining unit 120, are in synchronism both as to the receive signal sample rate, i.e., clock rate, and phase. Slicer 123 is a decision unit, which is typically employed, in known fashion, to compare incoming symbol values to so-called standard symbol values and, then, supplying as an output the closest standard symbol value to the current incoming symbol value. The symbol value output from slicer 123 is supplied to a positive input of algebraic combining unit 124, which generates a second error signal, and to DFE 121. DFE 121 is employed to combat any residual intersymbol interference in the output from slicer 123. An output from algebraic combining unit 124 is the second error signal, which is supplied to equalizer 119 and to echo canceler 118. It is noted that echo canceler 118 also includes an adaptive transversal filter of a type essentially identical to that employed in echo canceler 105 and the second error signal is employed to update the transversal filter coefficients in known fashion. In this example, the impulse response synthesis capability of the transversal filter employed in echo canceler 118 is longer than that of the transversal filter employed in echo canceler 105. This is because the impulse response synthesis capabilities of the transversal filter employed in echo canceler 118 must compensate for the impulse response of equalizer 119 convoluted with the echo path impulse response in hybrid 109. In a typical example the impulse response capability of the transversal filter in echo canceler 118 is in the range of 15 milliseconds. Furthermore, it is important to note that by employing echo canceler 118 after equalizer 119, the second error signal can be directly employed to update the coefficients of the transversal filters employed in both echo canceler 118 and equalizer 119 without further processing. As indicated above, if echo canceler 118 were employed before equalizer 119, the signal error signal could not be used directly and would have to go through a convolution process before it could be employed to update the transversal filter coefficients. Additionally, we have determined that it not necessary to employ each and every one of the incoming symbol values supplied to slicer 123 in determining the second error signal. Alternatively, a predetermined set of standard symbol values could be employed in determining which symbol values are supplied to algebraic combining unit 124. This set of symbol values includes symbols that are less likely than others to be impacted by decision errors. For example, symbols within a small distance from each other are more likely to be impacted by decision errors and, hence, are excluded from this set. This will effectively further speed up the tracking process and minimize the impact of decision errors. In other applications, for example those employing channel coding, a Viterbi decoder is used in place of slicer 123.

An output from slicer 123 is also supplied to demapper, decoder and descrambler 125, which yields the recovered data bits at output 126.

Note that in this example, not to be construed as limiting the scope of the invention, the transversal filter in echo canceler 118 is a finite impulse response (FIR) filter having characteristics as follows:

$$y[n] = \sum_{k=0}^{L-1} W_n(k) \cdot x[n-k], \quad \text{where}$$

$$W_{n+1}(k) = W_n(k) + Beta \cdot e[n] \cdot x[n], \quad \text{and where}$$

$W_n$ = FIR filter coefficients, $y[n]$ = output of the FIR filter, $x[n]$ = input to the FIR filter, $L$ = number of FIR filter taps, $e[n]$ = error signal from 124, and $Beta$ = step-size for updating FIR filter coefficients.

It will be apparent to those skilled in the art that echo canceler 118 can be employed by itself to combat both the primary echo component and the time variant echo resulting from circuit component value changes caused by temperature variations. However, by employing echo canceler 105 to combat the primary echo, the dynamic range of the echo is reduced, which translates into more rapid and more accurate tracking capability of echo canceler 118.

Figure 2:
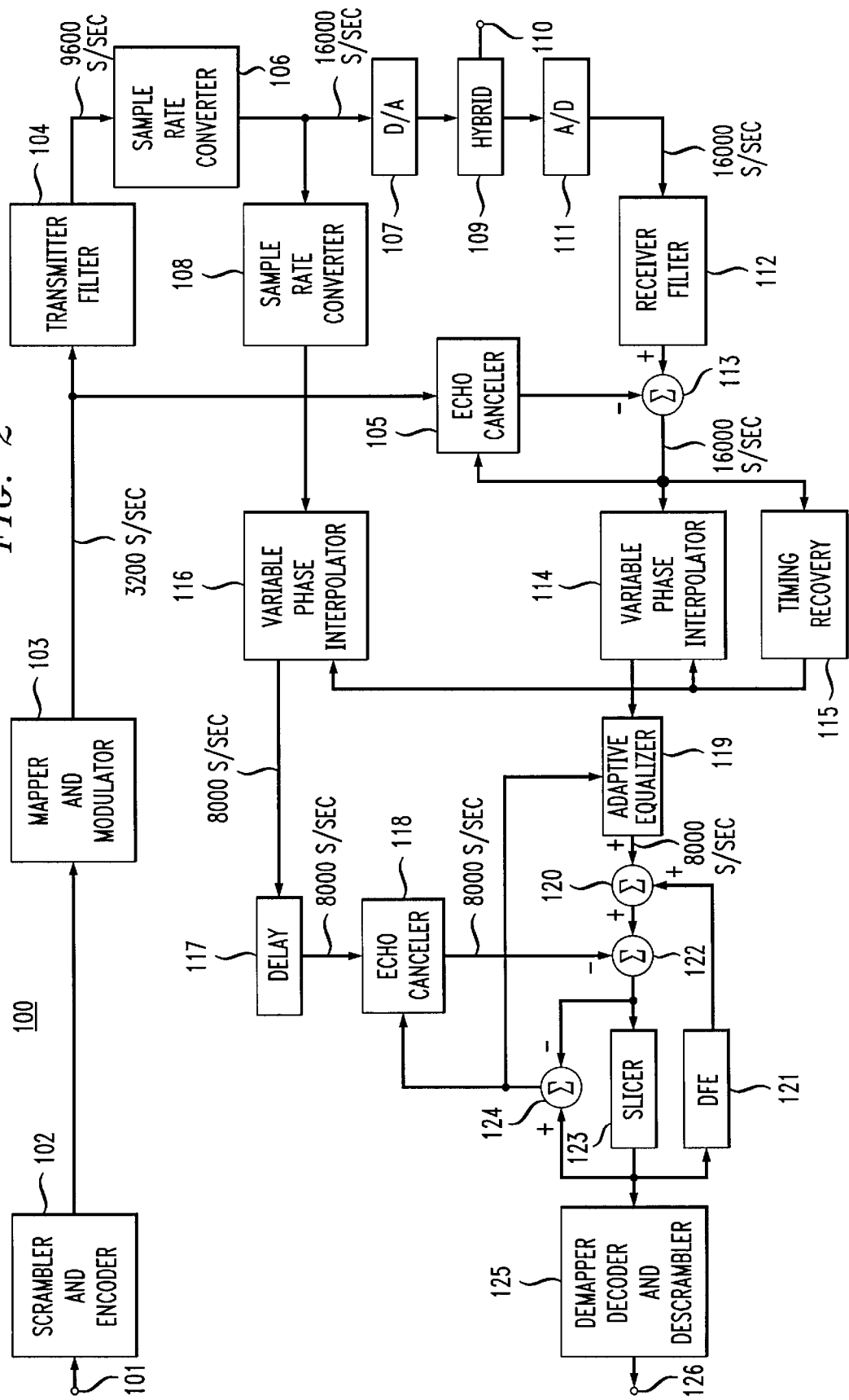
FIG. 2 shows, in simplified block diagram form, details of a modem shown in FIG. 1 including sample, i.e., clock, rates for particular transmit and receive modulation schemes.

FIG. 2 shows, in simplified block diagram form, details of a modem as shown in FIG. 1 including, sample, i.e., clock, rates for particular transmit and receive modulation schemes employed in one particular application. It will apparent to those skilled in the art that other embodiments of the invention may equally be employed in other applications. Since the elements of the modem shown in FIG. 2 are essentially identical to those shown in FIG. 1 they have been similarly numbered and are not described again in detail. Specifically, the modulation schemes employed in this example, are V.34 modulation in the transmitter and pulse code modulation (PCM) in the receiver. Thus, in the transmitter, the sample rate at the output of mapper and modulator 103 is 3200 samples/second (s/sec) and at the output of transmitter filter 104 is 9600 samples/second. Sample rate converter 106, in this example is a three (3) to five (5) sample rate converter and converts the 9600 samples/second transmitter rate from transmitter filter 104 to a transmit sample rate of 16000 samples/second. Sample rate converter 108, in this example, is a two (2) to one (1) sample rate converter and converts the 16000 samples/second transmit rate to the receive signal PCM rate of 8000 samples/second. Thus, the echo estimate signal generated by the transversal filter in echo canceler 118 is at the PCM rate of 8000 samples/second. In the receiver, the incoming received signal sample rate is 16000 samples/second. Thus, the echo estimate signal generated by the transversal filter in echo canceler 105 must be at the 16000 samples/second rate and conversion is, therefore, required from the 3200 samples/second rate to the 16000 samples/second rate. Consequently, the first error signal output from algebraic combining unit 113 is at the 16000 samples/second rate. This received signal sample rate is converted such that at the output of equalizer 119 the sample rate is the PCM rate of 8000 samples/second, which carries through algebraic combining unit 120. Consequently the echo estimate signal to from echo canceler 118 and the adjusted output signal from equalizer 119 are both at the PCM 8000 samples/seconds rate. Therefore, the second error signal developed at the output of algebraic combining unit 124 is at the PCM rate of 8000 samples/second.

The above-described arrangement is but one example of possible modulation schemes that may be employed in modem 100. It will be apparent to those skilled in the art how to convert the sample rates employed in other transmitter and receiver modulation schemes in order to practice the invention.

What is claimed is:

1. Echo canceler apparatus for use in a data modulator-demodulator including a transmitter and a receiver for supplying modulated data signals to a hybrid network for transmitting a transmit modulated data signal to and receiving a received modulated data signal from a remote data modulator-demodulator, the transmit signal having a predetermined sample rate and the received signal having a predetermined sample rate, the echo canceler apparatus comprising:

at least a first sample rate converter supplied with the transmit signal and being operative to convert the transmit signal sample rate to a receive signal sample rate;

an adaptive equalizer having an input and an output, said adaptive equalizer input being supplied with a version of a received signal, and an output signal from said output of the adaptive equalizer being at the received signal sample rate;

at least a first echo canceler including a transversal filter, the sample rate converted signal output from the at least first sample rate converter being supplied as an input to the at least first echo canceler and, therein, to a transversal filter, and being responsive to the sample rate converted signal and a first error signal to generate a first echo estimate signal;

a first algebraic combining unit for algebraically subtracting the echo estimate signal from the at least one echo canceler and an output signal from the adaptive equalizer;

a decision unit for yielding as an output a standard symbol value which is a representation of the current symbol value being supplied as an output from the first algebraic combining unit; and a second algebraic combining unit for algebraically subtracting the signal supplied from the first algebraic combining unit to the input of the decision unit from an output signal from the decision unit to yield the first error signal, the first error signal being supplied to the at least one echo canceler and to the adaptive equalizer for adjusting coefficients of transversal filters employed therein.

2. The invention as defined in claim 1 further including a second sample rate converter for converting a transmitter signal at a predetermined sample rate to the transmit signal sample rate.

3. The invention as defined in claim 2 wherein the transmit signal and the received signal have the same sample rate.

4. The invention as defined in claim 2 wherein the transmit signal and the received signal have different sample rates.

5. The invention as defined in claim 1 further including a timing recovery unit for generating phase error values from a version of the received signal and said first variable phase interpolator being responsive to the phase error values for yielding the phase adjusted version of the received signal.

6. The invention as defined in claim 5 further including a second variable phase interpolator being supplied with an output from the at least first sample rate converter and being responsive to the phase error values for adjusting the phase of the output from the at least first sample rate converter, wherein phases of outputs from the at least first and second variable phase interpolators are in synchronism, the output from the second variable phase interpolator being a sample rate converted and phase adjusted version of the transmit signal and being supplied as the adjusted signal version input to the at least one echo canceler.

7. The invention as defined in claim 6 wherein the decision unit is a slicer.

8. The invention as defined in claim 7 wherein the slicer includes apparatus for selecting predetermined ones of incoming symbol values to yield corresponding standard symbol values as an output.

9. The invention as defined in claim 6 wherein the decision unit is a Viterbi decoder.

10. The invention as defined in claim 9 further including a delay unit for inserting a delay interval into the input to the at least first echo canceler to compensate for any delay caused by the Veterbi decoder in yielding symbol values as an output.

11. The invention as defined in claim 1 further including a second echo canceler including a transversal filter, a version of a transmitter modulated data signal being supplied as an input to the second echo canceler and, therein, to the transversal filter, and being responsive to the version of the transmitter modulated data signal and to a second error signal for generating a second echo estimate and a third algebraic combining unit for subtracting the second echo estimate signal from a version of the receiver modulated data signal to yield the second error signal, a version of the second error signal being supplied as an input to the adaptive equalizer.

12. The invention as defined in claim 11 wherein the transversal filter in the at least first echo canceler has a longer impulse response synthesis capability than the transversal filter in the second echo canceler.

13. The invention as defined in claim 11 further including a second sample rate converter for converting a transmitter signal at a predetermined sample rate to the transmit signal sample rate.

14. The invention as defined in claim 13 wherein the transmit signal and the received signal have the same sample rate.

15. The invention as defined in claim 13 wherein the transmit signal and the received signal have different sample rates.

16. The invention as defined in claim 11 further including a timing recovery unit for generating phase error values from the second error signal and the at least first variable phase interpolator being responsive to the phase error values for yielding a phase adjusted version of the second error signal.

17. The invention as defined in claim 16 further including a second variable phase interpolator being supplied with an output from the at least first sample rate converter and being responsive to the phase error values for adjusting the phase of the output from the sample rate converter, wherein phases of outputs from the at least first and second variable phase interpolators are in synchronism, the output from the second variable phase interpolator being a sample rate converted and phase adjusted version of the transmitter signal and being supplied as the adjusted signal version input to the at least one echo canceler.

18. The invention as defined in claim 17 wherein the transversal filter in the at least first echo canceler has a longer impulse response synthesis capability than the transversal filter in the second echo canceler.

19. The invention as defined in claim 17 wherein the decision unit is a slicer.

20. The invention as defined in claim 19 wherein the slicer includes apparatus for selecting predetermined ones of incoming symbol values to yield corresponding standard symbol values as an output.

21. The invention as defined in claim 17 wherein the decision unit is a Viterbi decoder.

22. The invention as defined in claim 21 further including a delay unit for inserting a delay interval into the input to the at least first echo canceler to compensate for any delay caused by the Veterbi decoder in yielding symbol values as an output.

* * * * *